United States Patent [19]

Ackerman

[11] 3,994,180

[45] Nov. 30, 1976

[54] EXPANSIBLE SPROCKET DEVICE

[76] Inventor: Leonard Stanley Ackerman, 355 Lakeview Ave., Rockville Center, N.Y. 10020

[22] Filed: Apr. 11, 1975

[21] Appl. No.: 567,353

[52] U.S. Cl. .............................. 74/217 CV; 74/244

[51] Int. Cl.[2] ....................... F16H 9/00; F16H 9/24; F16H 11/02

[58] Field of Search............ 74/244, 230.18, 230.19, 74/230.22, 230.23, 217 R, 217 B, 217 CV, 217 C, 244

[56] References Cited

UNITED STATES PATENTS

| | | | |
|---|---|---|---|
| 724,449 | 4/1903 | Dumaresq | 74/244 |
| 3,913,410 | 10/1975 | Ackerman | 74/217 C |

*Primary Examiner*—Samuel Scott
*Assistant Examiner*—Allan R. Burke
*Attorney, Agent, or Firm*—Frederick W. Turnbull

[57] ABSTRACT

In a variable diameter driving sprocket for a chain drive change speed device comprising a plurality of circumferentially spaced radially movable toothed elements mounted on said driving sprocket over which the chain is threaded; a means to move the toothed elements radially which includes an adjusting gear or sprocket coaxial with said driving sprocket but free to rotate with respect to said driving sprocket, and differential means drivingly connecting said adjusting sprocket to said variable diameter driving sprocket.

7 Claims, 7 Drawing Figures

EXPANSIBLE SPROCKET DEVICE

A variable speed chain drive is shown in applicant's application Ser. No. 505,050, filed 11 Sept. 1974, in which pairs of sprockets, mounted rotatably on radially movable blocks mounted on a sprocket disc are adjusted radially by means of a cam mounted coaxially of said sprocket disc in a manner similar to the showing in the patent to Dumaresq U.S. Pat. No. 724,450.

The means to move the sprockets of Dumaresq or of the device shown in Applicant's earlier application radially are bulky and/or require expensive machining of elements that are not stock items.

In the present device the relative rotation between the variable diameter sprocket disc and a means to adjust the radial position of the pairs of sprockets of application Ser. No. 505,050 or of any other toothed elements used in lieu of said pairs of sprockets is comprised of inexpensive stock elements providing a differential drive between the shaft to which the sprocket disc is keyed, and a coaxial rotatable element mounted on the sprocket shaft.

It has also been found that the machining of the spiral cam slots used in the known devices to move the pairs of small sprockets radially of the sprocket disc are excessively expensive.

An object of the invention is to provide an inexpensive means to adjust small sprockets of a variable diameter sprocket radially inwardly or outwardly of a sprocket disc.

A further object is to provide such an adjusting means relying on chains and sprockets instead of on gearing.

A yet further object is to provide chain means in lieu of cam means to adjust the radial position of the sprockets on the variable diameter sprocket.

And a further object is to provide rack and gear means to move the small sprockets or other toothed elements of a variable diameter sprocket along radial guides.

Other and further objects and advantages will appear from the following specification taken with the accompanying drawing in which like reference characters refer to similar parts in the several views and in which.

Figure 1:
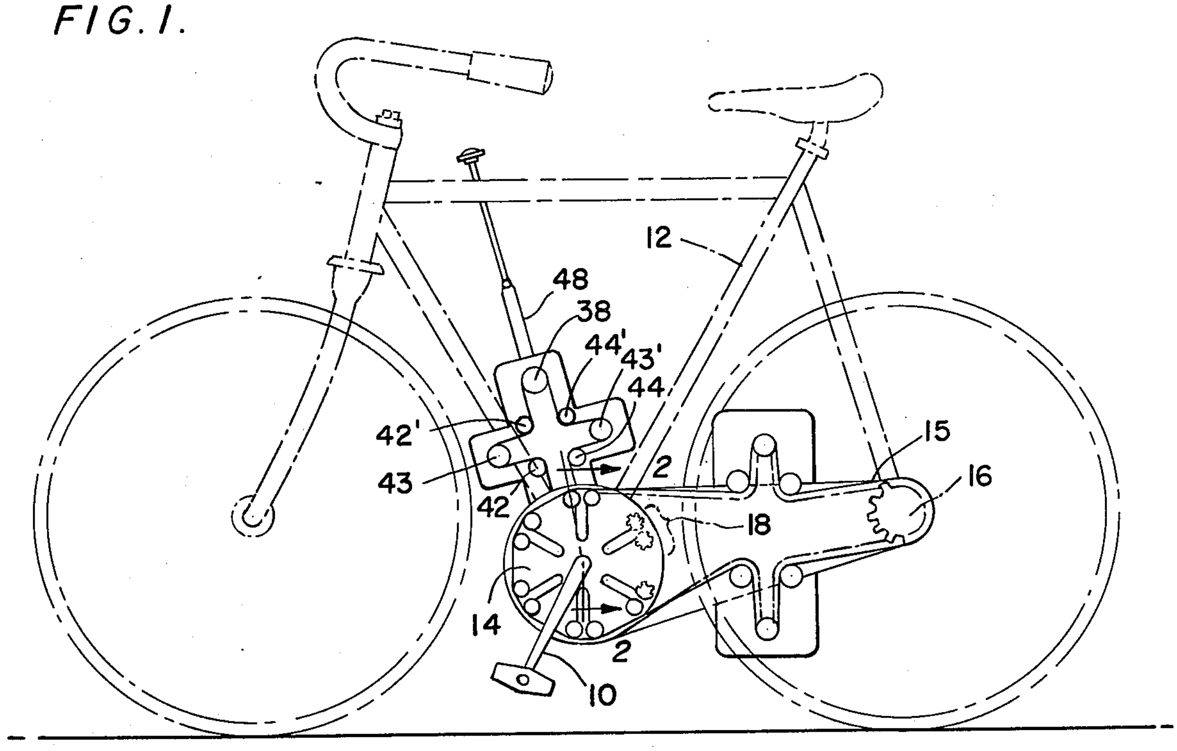
FIG. 1 is a general elevation of the device mounted on a bicycle.

From FIG. 1 it is seen that a pedal crank 10 on a bicycle 12, will rotate a variable diameter sprocket disc 14 which in turn drives rear wheel sprocket 16 by means of chains 15, as shown in application Ser. No. 505,050.

Figure 2:
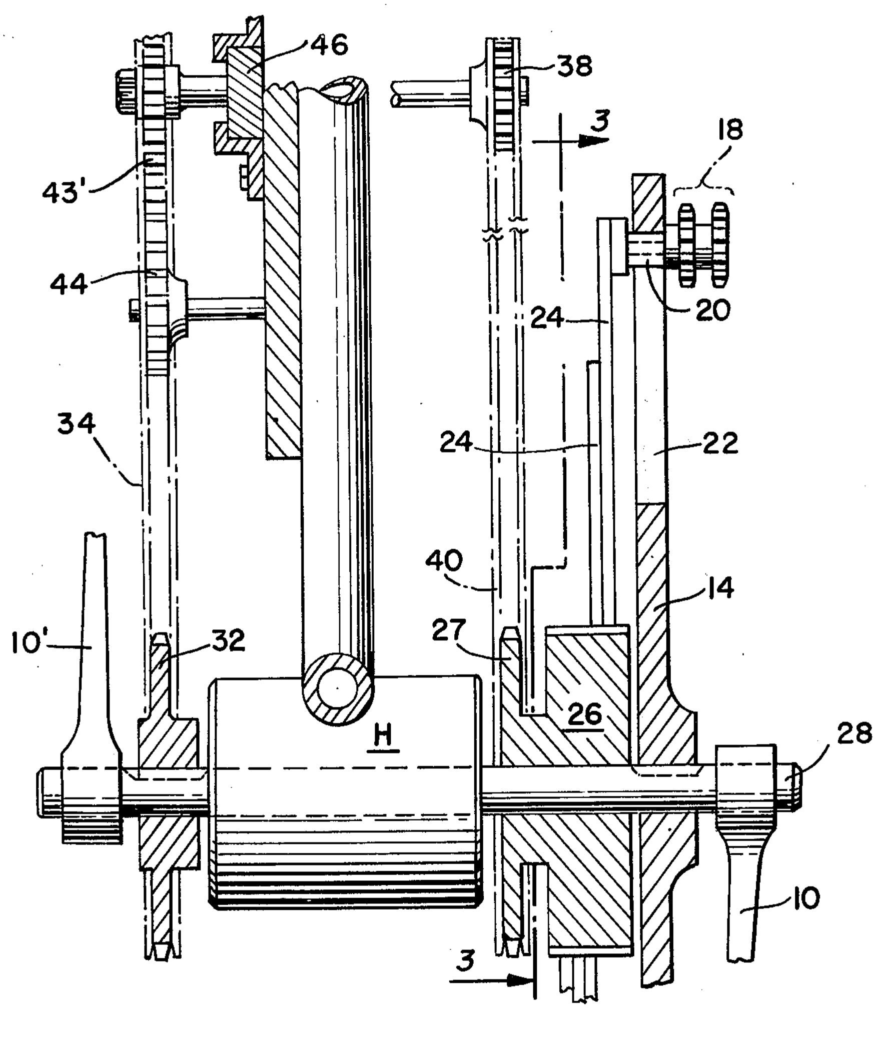
FIG. 2 is an enlarged section on the line 2—2 of FIG. 1.

From FIG. 2 it will be seen that pairs of sprockets are mounted on blocks 20 that slide radially in radial slots 22.

Figure 3:
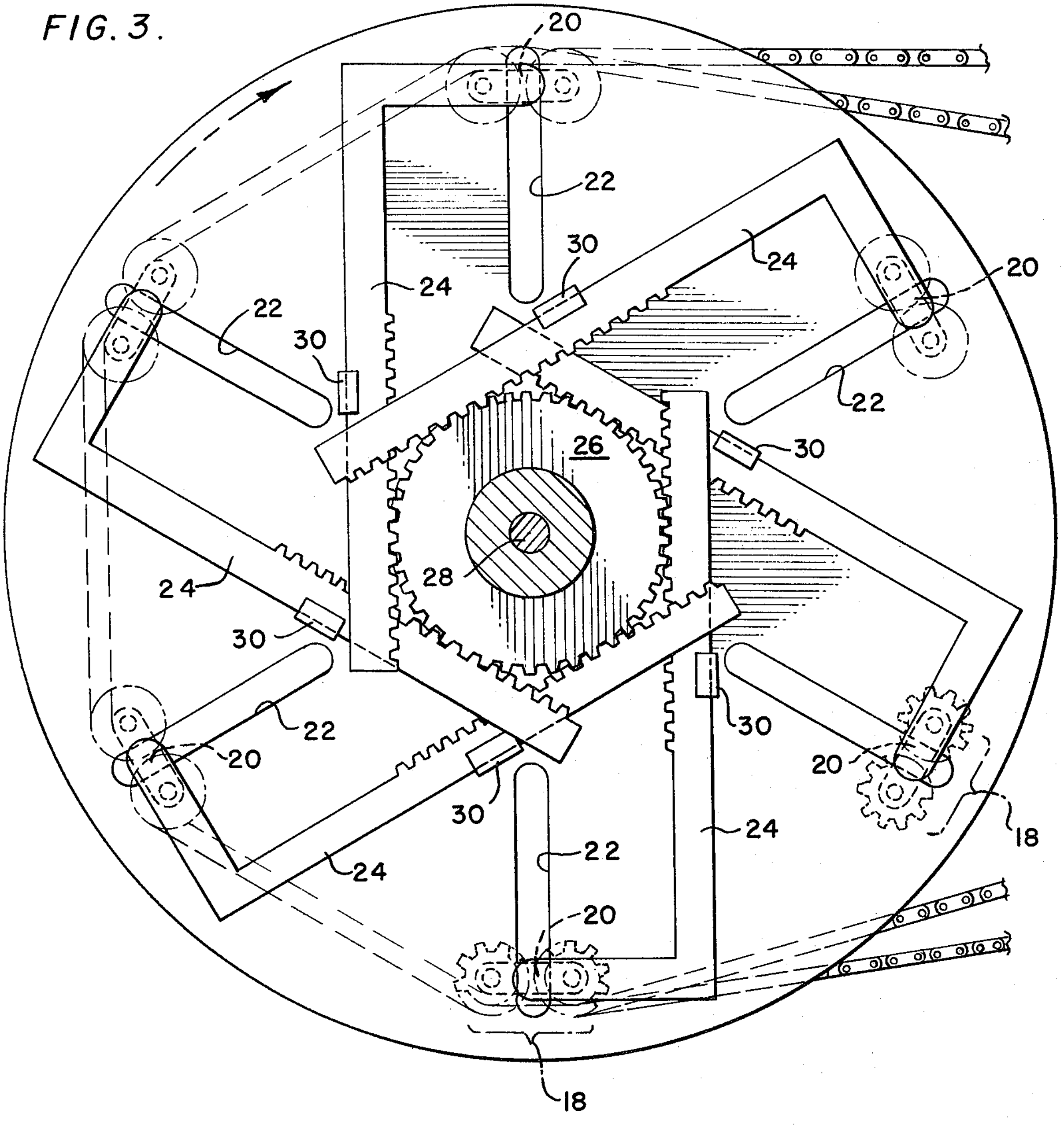
FIG. 3 is a section taken on line 3—3 of FIG. 2.

In FIG. 3 it will be seen that each block 20 is mounted on an L-shaped rack element 24, and each rack portion of each element 24 meshes with a gear 26 that is rotatable with respect to and mounted on the same shaft 28 as sprocket disc 14. L-shaped elements 24 are provided with guides 30 mounted on sprocket disc 14 to keep the rack teeth in mesh with gear 26.

It will be seen, then that if, in FIG. 3, gear 26 is rotated counter-clockwise with respect to disc 14, blocks 20 mounted on L-shaped rack elements 24 will be each moved radially inwardly along its slot 22.

Returning to FIG. 2 we see disc 14 keyed to shaft 28 to be positively rotated by crank 10. Mounted rotatably on shaft 28 is gear 26 which as we saw from FIG. 3, will adjust the radial distance along guide slots 22 of small sprockets 18 as it is rotated with respect to sprocket disc 14.

In order to rotate gear 26 with respect to disc 14, a sprocket 27 is fixed to gear 26.

Figure 4:
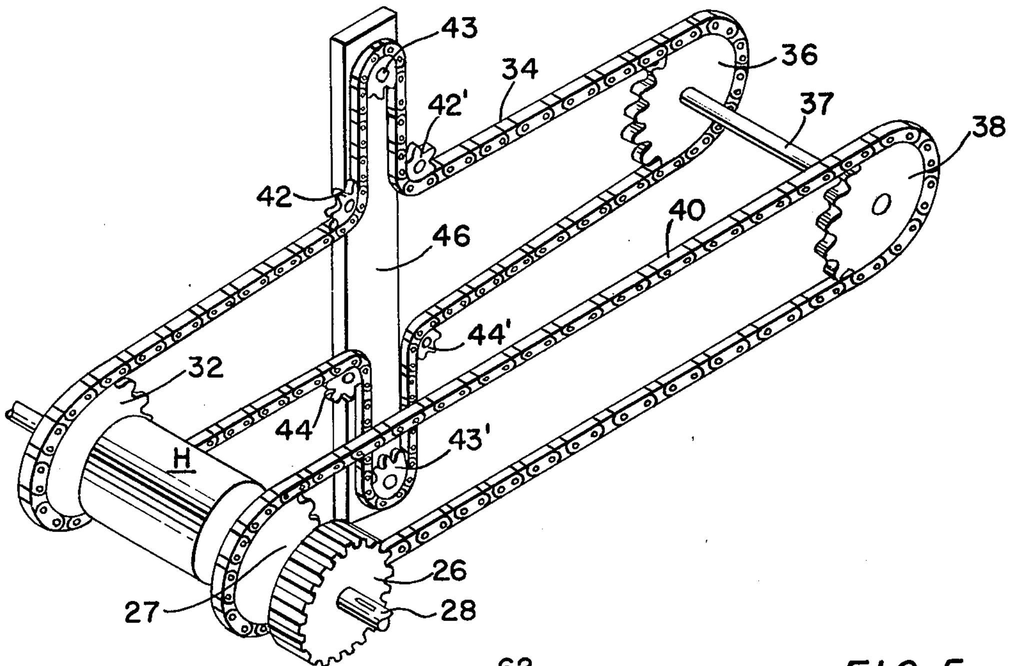
FIG. 4 is a view of a means to adjust the angular position of one rotatable element with respect to another rotatable element mounted on the same shaft.

Referring now to FIG. 4, gear 26 is shown. Disc 14 has been removed from shaft 28 in this view. The shaft 28 is mounted for rotation in the housing H of the bicycle frame. See also FIG. 2. A sprocket 32 is keyed to shaft 18, as are the pedal cranks 10, 10 (in FIG. 2) and the disc 14. Sprocket 32 is drivingly engaged with sprocket 27 through chain 34 driving sprocket 36 which is secured to the same shaft 37 as is sprocket 38 with which chain 40 meshes to drive sprocket 27 to rotate gear 26 with respect to disc 14 keyed to shaft 28.

As shown in FIG. 4 idler sprockets 42, 42' and 44, 44' are rotatably mounted in fixed position with respect to sprockets 32 and 36. Chain 34 is trained from sprocket 32, over idler 42, then over a movable sprocket 43 then over fixed sprocket 42', then to sprocket 36. Returning to sprocket 32 from sprocket 36, chain 34 passes around fixed sprocket 44', movable sprocket 43', fixed sprocket 44, thence to sprocket 32. Movable identical sprockets 43 and 43' are mounted on a slide 46 so that, as the slide 46 moves upwardly, in FIG. 4, the part of the flight of chain 34 between fixed idler sprockets 42, 42' will become longer, and the flight of chain 34 between fixed idlers 44' and 44 will be correspondingly shortened. If, then, sprocket 32 were held stationary sprocket 36 would be rotated counter-clockwise as slide 46 is moved upwardly in FIG. 4, and would be rotated clockwise if slide 46 is moved downwardly. At any fixed position of slide 46, then, sprocket 32 and 36 are rotated together.

Sprocket 36, as noted above is keyed to shaft 37 to which sprocket 38 is also keyed. Sprocket 38 is drivingly connected to sprocket 27 by chain 40. It will be seen then, that, assuming sprocket 32 to be held stationary, movement of slide 40 upwardly in FIG. 4 will rotate sprocket 27 counter-clockwise and moving it downward will rotate sprocket 27 clockwise. Sprockets 27 and 32 being of the same diameter, and sprockets 36 and 38 being of the same diameter, it will follow that if sprocket 32, in FIG. 4 is rotated, and slide 46 is stationary, sprocket 27 must rotate at the same speed and in the same direction as sprocket 32.

Since sprocket 32 and disc 14 are both keyed to shaft 28 it will be seen that if slide 46 is fixed, sprocket 27, therefore gear 26, will rotate with disc 14 but if slide 46 is moved up or down in FIG. 4, whether the shaft 28 is rotating or not, the sprocket 27 and gear 26 will rotate counter-clockwise or clockwise with respect to disc 14.

With respect to sprockets 43 and 43' it will be understood that a larger diameter of these sprockets will give a greater angular adjustment between sprockets 32 and 36 compared to the distance of movement of slide 46.

Similarly the smaller the diameter of sprockets 32 and 36 compared to the diameters of sprockets 43, 43', the greater the angular movement between sprocket 32 and sprocket 36 for the same distance of movement of slide 46 carrying identical sprockets 43, 43'.

A lever 48, see FIG. 1, is provided to move slide 46. The position of the arrangement of sprockets and chains described drove in connection with FIG. 4 is shown in FIG. 1 positioned so that slide 46 slides forwardly or rearwardly instead of up or down. It will also be noted that, to adapt the FIG. 4 arrangement to use in any environment the fixed idler sprockets and movable identical sprockets may be used in connection with chain 40 instead of in connection with chain 34.

Figure 5:
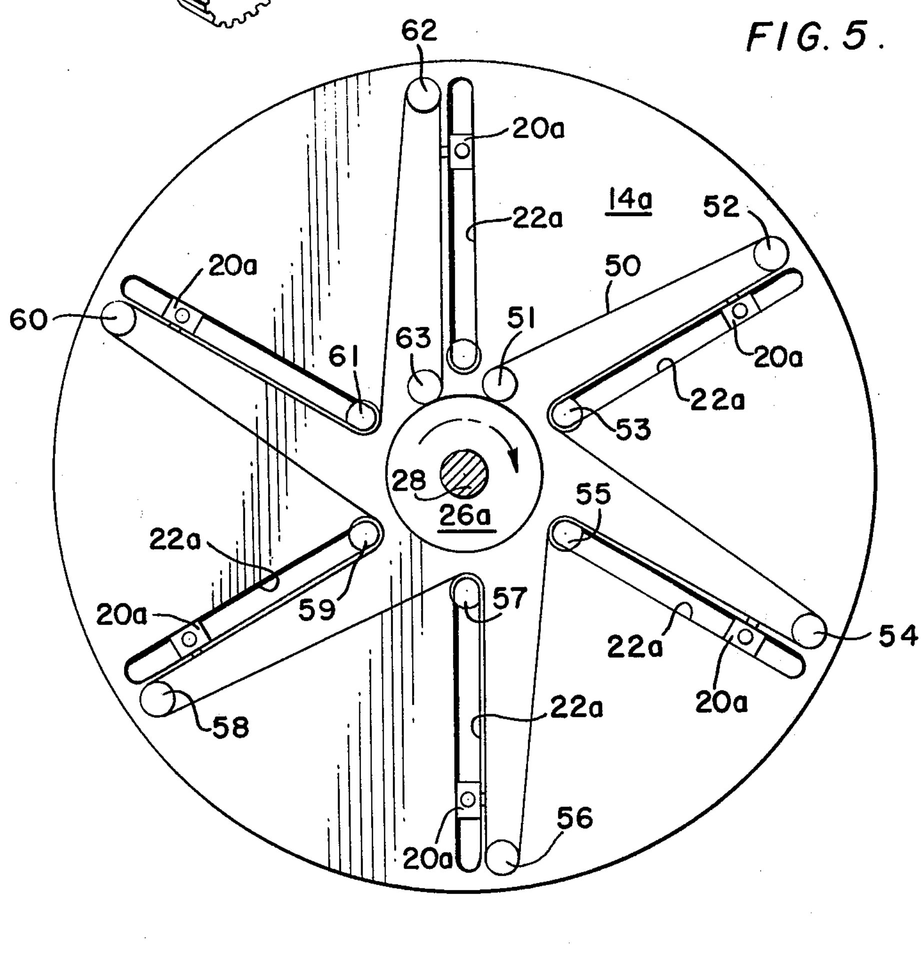
FIG. 5 is a diagrammatic view of a chain means to move all of the small sprockets of a variable diameter sprocket simultaneously inwardly or outwardly.

FIG. 5 shows an alternate means to move the blocks 20 radially along slots or guides 22 in disc 14. In FIG. 5 gear 26 is replaced by a sprocket **26*a* about which a chain 50 is trained. From sprocket 26*a* chain 50 is trained around sprockets 51, 52, 53, 54, 55, 56, 57, 58, 59, 60, 61, 62 and 63, and so back to sprocket 26*a***.

The flights of chain 50 between sprockets 52 and 53, 54, and 55, 56 and 57, etc., are each parallel to and adjacent successive radial slots or guides **22*a* in disc 14*a* so, if sprocket 26*a* is rotated in one direction with respect to disc 14*a* the blocks 20*a*, which are secured to chain 50, will be moved in one radial direction and if sprocket 26*a* is rotated in the other direction with respect to disc 14*a* the direction of movement of blocks 20*a* in slots 22*a*** will be reversed.

It will be noticed that if the small sprockets 18, in FIG. 1 are at their outermost radial position there will be a pull on the chains 15 between variable diameter sprocket 14 and the sprocket 16 on the rear wheel of the bicycle. This tension will tend to pull blocks 20 radially inwardly. It may be necessary, therefore, to provide a means to prevent lever 48 from moving under the influence of this pull which will also tend to move sprockets 43, 43' with the slide 46. Movement of lever 48 may be prevented, if required, by providing a notched bar into the notches of which lever 48 may be engaged. Any other conventional means of holding lever 48 in selected positions may be used.

Figure 6:
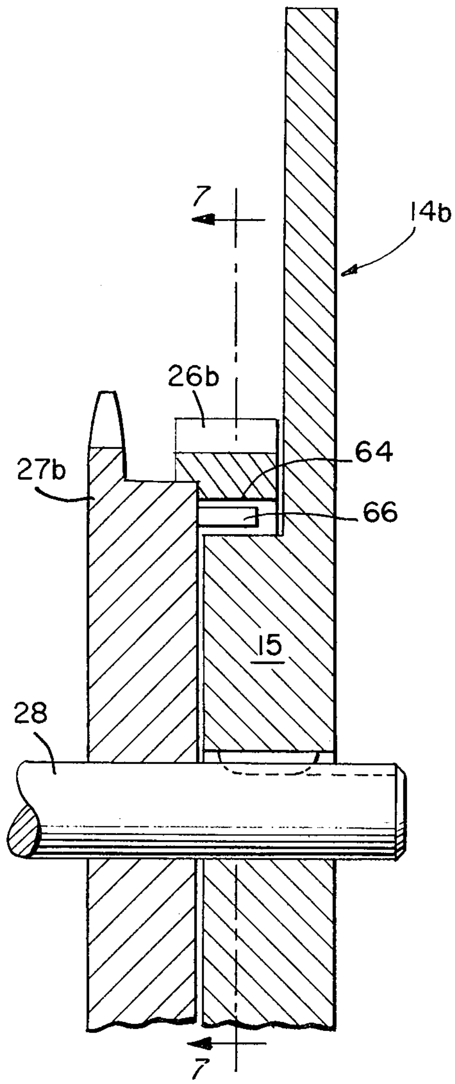
FIG. 6 is a section on line 6—6 of FIG. 7 showing safety means.
Figure 7:
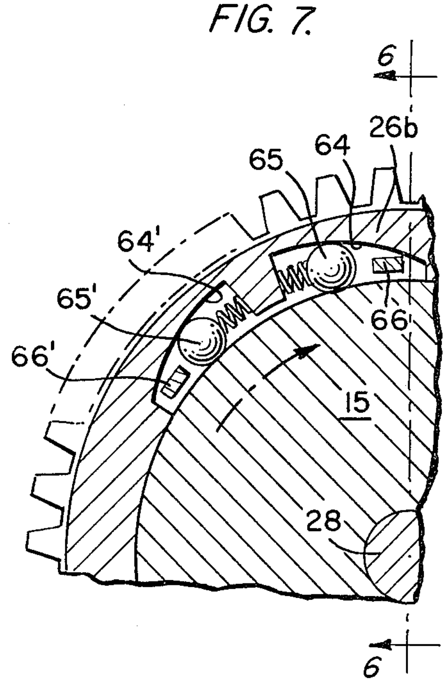
FIG. 7 is a section on line 7—7 of FIG. 6.

FIGS. 6 and 7 show a means by which any radial pull on sprockets 18 is prevented from being transmitted to chains 40, and 34.

In FIG. 6 it is seen that sprocket disc **14*b* is provided with a hub portion 15 extending into a large central recess in gear 26*b*. Gear 26*b* is mounted for rotation with respect to sprocket 27*b*. The central recess in gear 26*b* is provided with at least two opposed cam surfaces 64, 64' each to engage a detent clutch element 65 or 65' which are spring pressed to normally contact the cylindrical surface of hub 15 under the influence of the adjacent cam surface 64 or 64'**.

Extending from sprocket **27*b* are fingers 66, 66' positioned respectively between cam surfaces 64 and 64' and in such position with respect to detent clutch elements 65, and 65' that when sprocket 27*b* is rotated counter clockwise in FIG. 7 finger 66 contacts detent 65 so that gear 26*b* may rotate counter clockwise with respect to hub 15, and if sprocket 27*b* is rotated clockwise in FIG. 7 finger 66' on sprocket 27*b* contacts detent element 65' so that gear 26*b* may rotate clockwise with respect to hub 15**.

It is clear, then that any pull on small sprockets 18 can not be transmitted to sprocket **27*b* as the detent elements 66 and 66' hold gear 26*b* locked against rotation with respect to hub 15 unless, or until, sprocket 27*b* is rotated to release one or other detent 66, or 66'**.

It will be apparent from the above that while the invention is illustrated as being used on a bicycle to give a variable speed drive, the invention may be used in many other ways. The scope of the invention, therefore, is not to be limited to its use in connection with bicycles but only in accordance with the scope of the following claims.

I claim:

1. In a variable speed chain drive transmission a shaft, a variable diameter sprocket comprising a disc keyed to said shaft, a plurality of guide means extending generally radially of said disc, a plurality of block means each carrying toothed chain engaging means mounted to move along one of said guide means, means rotatably mounted on said shaft adjacent said disc, means actuated by said means rotatably mounted on said shaft adjacent said disc to move said block means simultaneously radially along said guide means, the improvement comprising a first sprocket mounted on said shaft keyed to said shaft, and a second sprocket rotatably mounted on said shaft drivingly engaging said means rotatably mounted on said shaft adjacent said disc, and adjustable chain means engaging said first and second sprockets whereby said second sprocket may be driven by said first sprocket to rotate said means rotatably mounted on said shaft adjacent said disc with respect to said disc to move said block means radially along said guide means to adjust the effective diameter of said variable diameter sprocket.

2. The variable speed transmission of claim 1 in which said means rotatably mounted on said shaft adjacent said disc is a gear and the means actuated by said gear comprises a plurality of racks each rack meshing with said gear and connected to one of said block means.

3. The variable speed transmission of claim 1 in which said means is a sprocket and said disc is provided with a plurality of sprockets rotatably mounted on said disc, an endless chain is trained over said sprockets to provide flights of chain parallel to each said guide means, and means securing each said block means to said endless chain whereby said block means may be selectively moved along said guide means.

4. The device of claim 1 in which said adjustable chain means includes two endless chains meshing one with said first sprocket and one with said second sprocket and each meshing with a sprocket keyed to a jack shaft parallel to said shaft.

5. The device of claim 4 in which two pairs of fixed spaced sprockets are positioned to contact the outer sides of the flights of chain of one of said endless chains, a slide is mounted to move transversely of said flights of chain, two idler sprockets are mounted on said slide and mesh, one with each said flight of chain between said spaced sprockets, said idler sprockets being widely spaced so that the part of the flights of chain between said pairs of fixed sprockets will be lengthened or shortened as said slide is moved transversely of said of flight of chain.

6. The device of claim 4 in which means is provided to simultaneously change the lengths of chain in the flights of chain between one of said first and second sprockets mounted on said shaft, lengthening one flight and shortening the other flight.

7. The device of claim 1 in which means is provided between said second sprocket and said disc, said means including brake means to prevent relative rotation between said second sprocket and said disc said brake means being released by a torque imposed on said second sprocket to rotate said second sprocket with respect to said disc.

* * * * *